US007300043B1

(12) United States Patent
Lindsay et al.

(10) Patent No.: US 7,300,043 B1
(45) Date of Patent: Nov. 27, 2007

(54) ROTATING POSITIONING VISE

(76) Inventors: Steven James Lindsay, 3714 W. Cedar Hills, Kearney, NE (US) 68845; Stephen Ellison Shepherd, 70365 Mottle Cir., Rancho Mirage, CA (US) 92270

( * ) Notice: Subject to any disclaimer, the term of this patent is extended or adjusted under 35 U.S.C. 154(b) by 191 days.

(21) Appl. No.: 11/248,732

(22) Filed: Oct. 11, 2005

(51) Int. Cl.
*B23Q 1/25* (2006.01)
*B25B 1/22* (2006.01)

(52) U.S. Cl. ........................................ 269/75; 335/285

(58) Field of Classification Search .................. 269/75, 269/242; 335/285; 248/206.5, 309.4, 346.01, 248/346.06, 685
See application file for complete search history.

(56) References Cited

U.S. PATENT DOCUMENTS

| | | | | |
|---|---|---|---|---|
| 1,778,481 | A * | 10/1930 | Boucher | 335/219 |
| 2,796,788 | A | 7/1957 | Bohn | |
| 2,993,395 | A * | 7/1961 | Bohn | 269/75 |
| 3,428,305 | A | 2/1969 | Bohn | |
| 3,815,892 | A | 6/1974 | Tulk | |
| 4,251,791 | A | 2/1981 | Yanagisawa et al. | |
| 4,303,054 | A * | 12/1981 | Lore | 125/11.01 |
| 4,329,673 | A | 5/1982 | Uchikune et al. | |
| 4,549,727 | A | 10/1985 | Kozar | |
| 4,572,492 | A | 2/1986 | Kawakita | |
| 5,066,936 | A * | 11/1991 | Hsu | 335/295 |
| 6,915,725 | B2 | 7/2005 | Bridges | |

* cited by examiner

*Primary Examiner*—David B Thomas

(57) ABSTRACT

A rotating positioning vise for use in hand working operations. The positioning mechanism utilizes a permanent magnet that is lifted off the surface of a turntable by the means of a lever. The user pushes on the lever, moves the vise in the position desired and then releases of the lever. Releasing the lever allows the magnet to be pulled back down against the turntable's surface and locks the vise in position.

18 Claims, 7 Drawing Sheets

ROTATING POSITIONING VISE

BACKGROUND OF THE INVENTION

1. Field of Invention

The present invention relates to a positioning vise, more particularly, to a rotating positioning vise for use in hand working operating such as hand engraving and stone setting in the hand engraving, hand carving and jewelry fields.

2. Description of Prior Art

The traditional hand engraving vise which has been in existence since the nineteenth century, consists of a ball base resting in a doughnut type cradle. The top half of the ball is made to pivot on a center axis. On top of this are the vise jaws. When the engraver or jeweler desires to hand engrave an arc on an object that is clamped in the jaws, he simply turns the vise with one hand while the other hand holds the engraving point on the surface of the object that is being engraved. The location of the rotating pivot position on the object being engraved can determine the difficulty of engraving an arc in the desired location. The location of the rotating pivot position depends on where the object is clamped in the jaws of the vise. An arc is easiest to engrave when it has its center location closest to the center pivot position of the rotating vise. Engravers and jewelers therefore become accustomed to having to unclamp, move and re-clamp the object many times in the course of a project. Unfortunately, clamping and unclamping to position the object in reference to the vise pivoting location can become a problem since the objects engravers and jewelers work on are often delicate and can be damaged if clamped incorrectly. In addition, a lot of time is wasted unclamping and clamping. Another example of the need to position a working area of an object in the center of a rotating vise is when delicate hand working operations are executed with a microscope. The microscope is centered over the rotating pivot position of the vise. The field of view through the microscope is limited and in order to keep a particular spot in view, the axis of rotation needs to stay in the center of the field of view of the scope, otherwise the area being viewed will swing out of view when the vise is rotated.

Disclosed in publication titled GRS POSITIONING VISE by GRS Corporation is a rotating positioning vise. The device utilizes a post though an oversized hole in a plate under the vise jaw apparatus. The vise jaw apparatus on top of the vise is made to slide around for positioning within the space between the post and oversized hole. The limitation to the apparatus is its limited movement between the post and hole. The nature of the design leaves little room between the post and oversized hole. The apparatus allows only one inch of movement off center. One inch is not enough room for movement if the engraver or handworker is working on an object any larger than this movement. Engravers, jewelers and handworkers therefore still have to unclamp and re-clamp in order to work outside the one inch radius area.

In more recent times engravers have employed turntables or lazy-susans with a vise set on top. The vise is simply pushed around on the turntable top for positioning. This works and gives a lot of movement for positioning although the vise is not solidly locked down on the turntable and can move at undesirable times. Also, this design does not allow tilting of the turntable to a more conformable position since the vise will slide off of the turntable if it is tilted. A similar adaptation to pushing a vise around on a turntable is to use a thin magnetic sheet material between the base of the vise and the turntable. The thin magnetic sheet material has a low enough magnetic power to allow it to be manually positioned and yet hold the vise in place. The problem and disadvantage that occurs in using magnetic sheet in this way is that positioning the vise is harder for the user, because it takes more force to break the magnetic force free to allow the vise to slide on the turntable. A lighter strength magnetic sheet can be used but then it does not have enough strength to hold the vise secure on the turntable.

A rotating positioning vise that allows a lot of freedom of movement is needed so that the user can accommodate, position and secure larger objects. The vise needs to rotate freely on its lower portion, and on top it needs a position apparatus that will allow it and the jaws to move together as a unit. This will allow the jaws and whatever is clamped in the jaws to be positioned and allow a desired portion of the object that the user is working on be in the center axis of rotation. Once the user positions the vise it needs to be locked securely in place to prevent it from moving during use. Engravers, jewelers, carvers and handworkers at times prefer to tilt their vise from side to side or towards them for comfort. Therefore, the vise should have a built in apparatus that allows the entire vise to be titled at will. The vise should have a locking mechanism for both the rotating turntable and positioning apparatus. The locking mechanisms should be easily and quickly locked and unlocked at will by the user.

OBJECTS AND SUMMARY OF THE INVENTION

It is the object of this invention to provide a rotating positioning vise that will position quickly. It is also an object that the positioning feature of the vise will allow a great deal of positioning movement that is only limited by the size of turntable. It is also an object of the invention to allow the vise to be tilted and locked by the user, as well as provide a locking feature for the rotating axis of the vise. The positioning feature of the invention utilizes a permanent magnet that is lifted off the surface of the tilting turntable by the means of a lever. The user pushes on the lever, moves the vise in the position desired and then lets the lever loose. Letting the lever loose allows the magnet to be pulled back down against the turntable's surface and locks the vise in this position. The benefit of the invention for the engraver, jeweler, or hand worker is time saved in not having to continually unclamp, move the object and re-clamp. With the invention the user only needs to determine the best and safest way to hold an object in the vise once. This reduces the risk of damaging the object when continually unclamping and re-clamping to reposition the object.

BRIEF DESCRIPTION OF THE DRAWINGS

The preferred embodiment of the invention is described below with reference to attached drawing figures, wherein.

DETAILED DESCRIPTION OF THE PREFERRED EMBODIMENT

Figure 1:
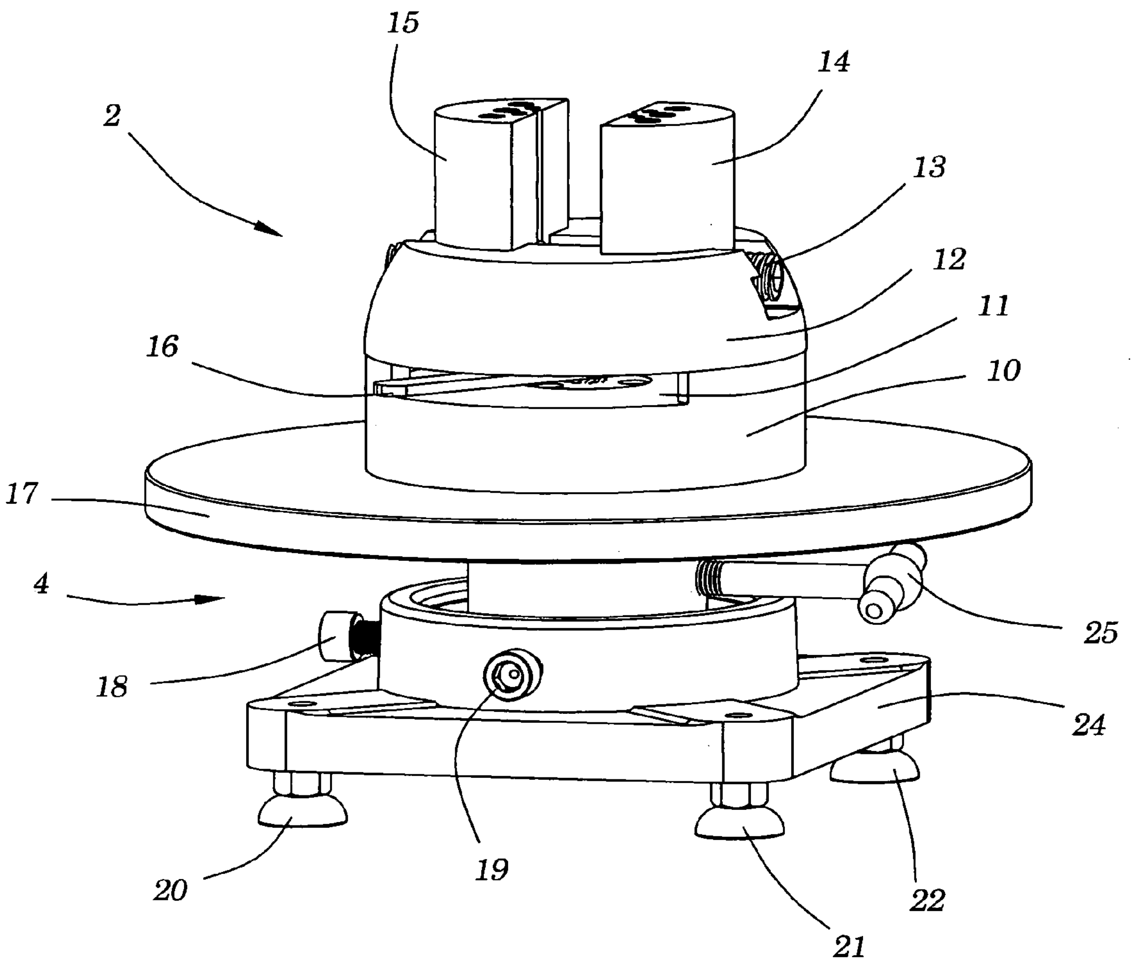
FIG. 1; is a perspective view of a rotating positioning vise constructed in accordance with the present invention.

A rotating positioning vise in accordance with the present invention is illustrated in FIG. 1. The apparatus consists of a vise 2 and a turn-table 4.

Figure 8:
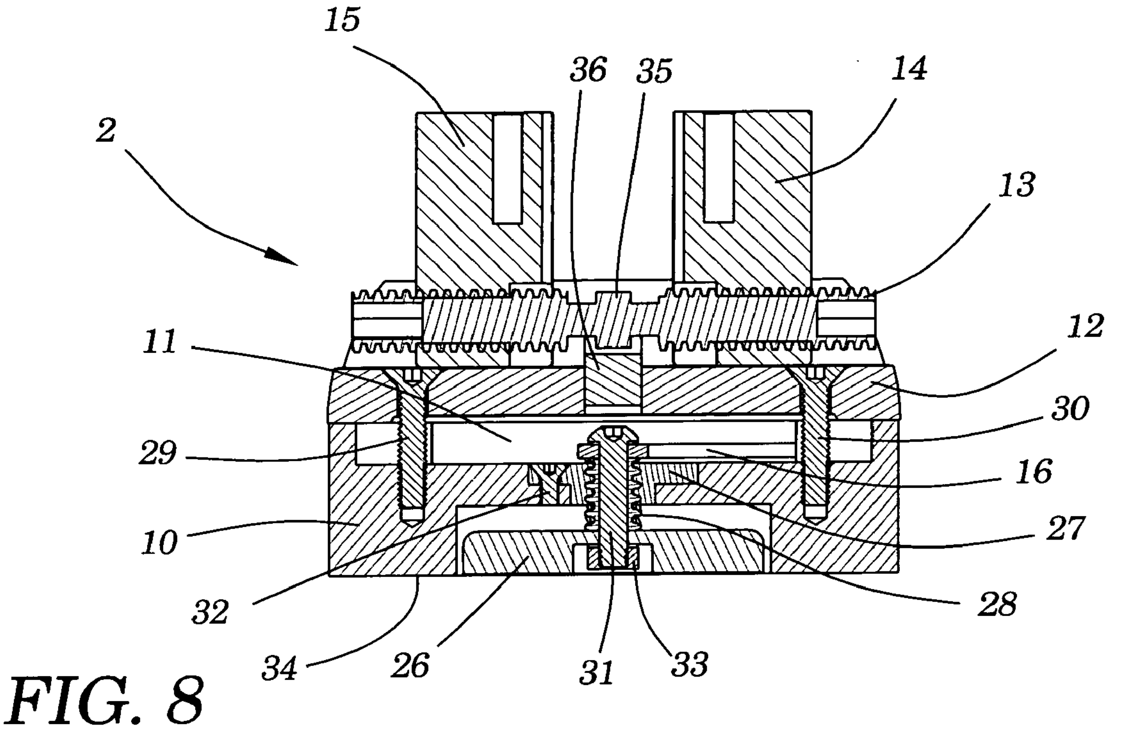
FIG. 8 and FIG. 9; are sectional views of the top vise portion illustrating how the magnet, lever, screw and nut are connected.
Figure 9:
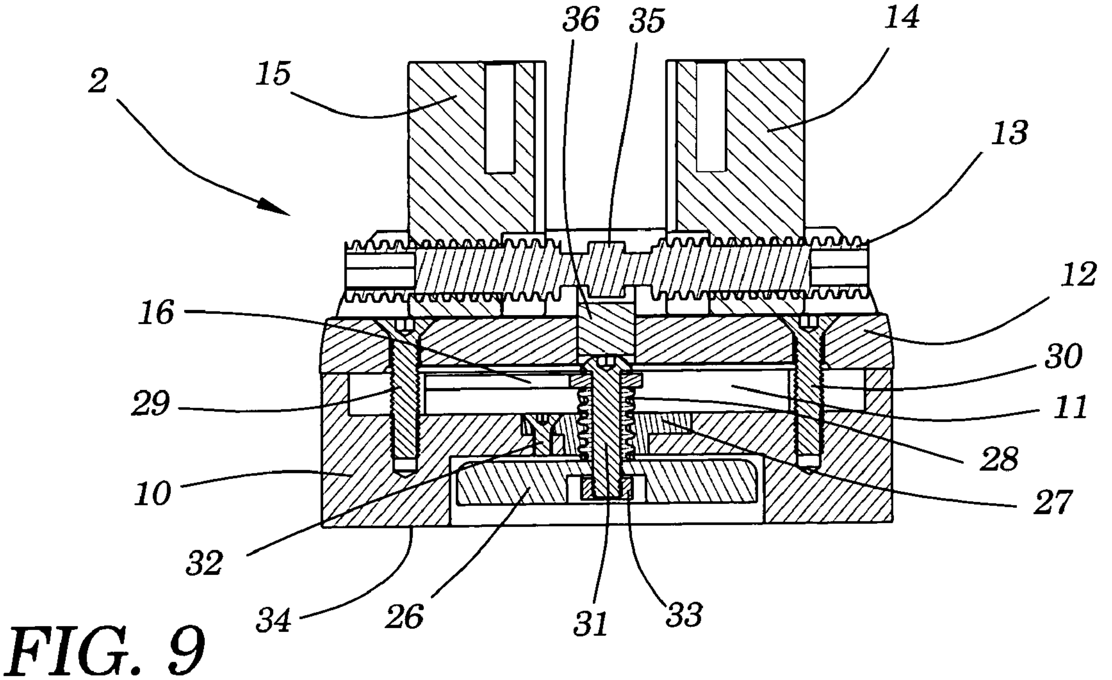
Figure 10:
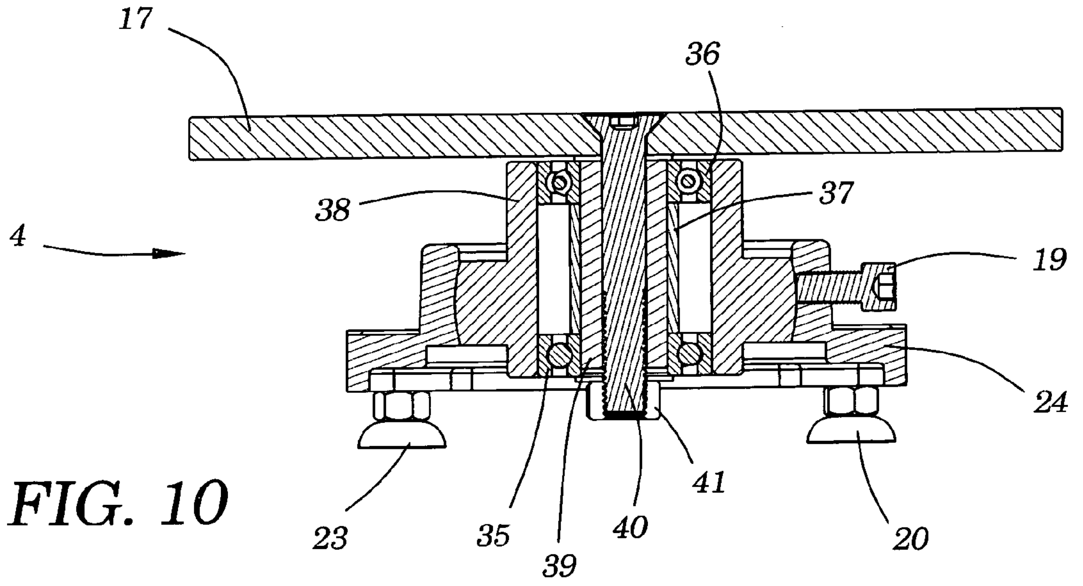
FIG. 10; is a sectional view of the bottom turn-table portion of the invention.
Figure 11:
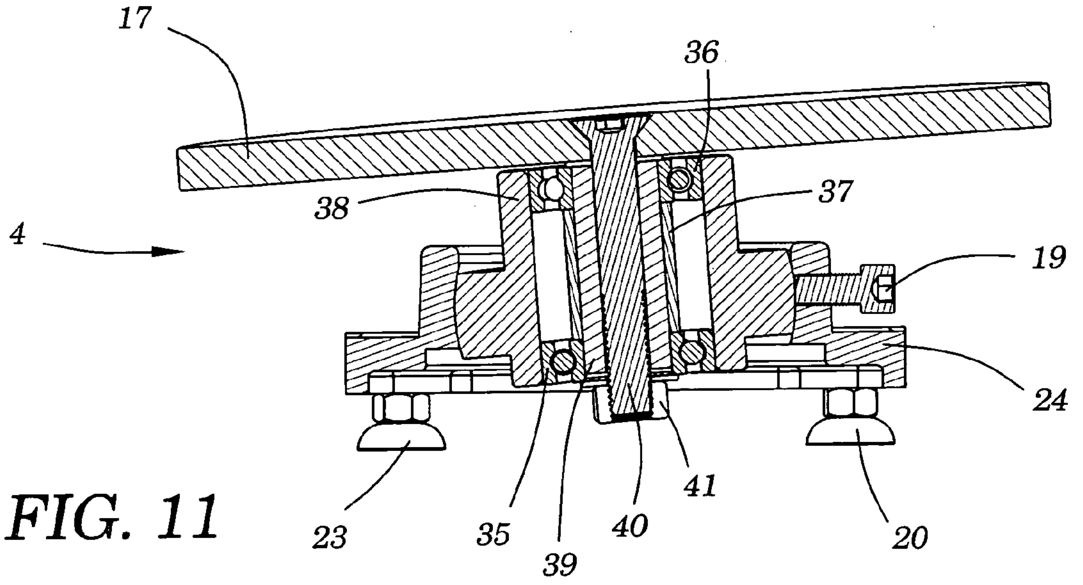
FIG. 11; is the same view as FIG. 10, differing in that it illustrates the titling movement of the turn-table.

Referring to FIG. 1, the turn-table 4 includes a disc 17 made of a magnetic attraction material, a t-handle 25, tilt-lock-screws 18 and 19, a turn-table-base 24, and feet 20, 21, 22, and 23. (Note; foot 23 is not shown in FIG. 1.) Referring to sectional drawing FIG. 10, the turn-table 4 also includes a bearing-housing 38, a screw 40, a nut 41, bearings 35 and 36, a spacer 37, and a sleeve 39. The turn-table 4 is designed to allow disc 17 to spin about its axis and also tilt in relation to the turn-table-base 24. The outside race of bearings 35 and 36 are press fit into bearing-housing 38. Sleeve 39 is fit in the inside race of bearings 35 and 36. Spacer 37 is placed between the two bearings. Screw 40 and nut 41 fasten the disc 17, bearing assembly and bearing-housing 38 together. The outside diameter of bearing-housing 38 is made to nest within the turn-table-base 24 so that it allows bearing-housing 38 to tilt. FIG. 11 illustrates the tilting of bearing-housing 38. Referring to FIG. 1 and FIG. 10, tilt-lock-screws 18 and 19 are used by the operator to lock bearing-housing 38 in place. T-handle 25 illustrated in FIG. 1 is threaded through the neck of bearing-housing 38 so that it intersects spacer 37. It is used, if desired by the operator, to lock the free rotation of disc 17 in place or, if desired by the user, it may also be used if slightly snugged up, to give a small amount of drag on the rotational movement of disc 17. Feet 20, 21, 22, and 23 are attached to the four corners of turn-table-base 24 and are adjustable to aid in leveling. Referring to FIG. 1, the vise 2 includes jaws 14 and 15, a jaw-screw 13, a vise-jaw-block 12, a vise-base-block 10, a lever 16, and a lever-slot 11. Referring to sectional drawing in FIG. 8, the vise 2 also includes a magnet 26, a base-block-bottom-face 34, a magnet-lift-screw 28, a magnet-lift-nut 27, a jaw-screw-boss 35, a jaw-screw-fork 36, screws 29 and 30, screw 32, screw 31, and a nut 33. Referring to FIG. 8, the vise 2 allows objects to be clamped in its jaws 14 and 15. Jaws 14 and 15 have internal right and left-handed threads for mating to jaw-screw 13. The jaws are made to fit in a T slot on the top of vise-jaw-block 12. The lower portion of jaw-screw-fork 3 is press fit into a hole in the center of vise-jaw-block 12. It is not shown well in the sectional view FIG. 8, but the upper portion of jaw-screw-fork 3 has two fingers that protrude on either side of jaw-screw-boss 35 that is part of jaw-screw 13. This entraps jaw-screw 13 and keeps it and jaws 14 and 15 from sliding out of the T slot in vise-jaw-block 12. Vise-jaw-block 12 is bolted solid to vise-base-block 10 with screws 29 and 30. Magnet-lift-nut 27 is fixed into place with screw 32 and two other similar screws that do not show in the sectional drawings FIG. 8 or FIG. 9. Lever 16, magnet-lift-screw 28, and magnet 26 are attached together with screw 31 and nut 33. Lever 16 is long enough that it protrudes slightly out of the lever-slot 11 on the outside diameter of the vise-base-block 10. Magnet-lift-screw 28 and magnet-lift-nut 27 have mating threads so that when lever 16 is rotated it will raise or lower magnet 26.

Not shown in the illustrations is a thin polymer sheet material such as plastic or nylon that is fastened (preferably by gluing) to the base-block-bottom-face 34. The thin sheet material also covers over the magnet void portion on the base-block-bottom-face 34.

OPERATION

Figure 4:
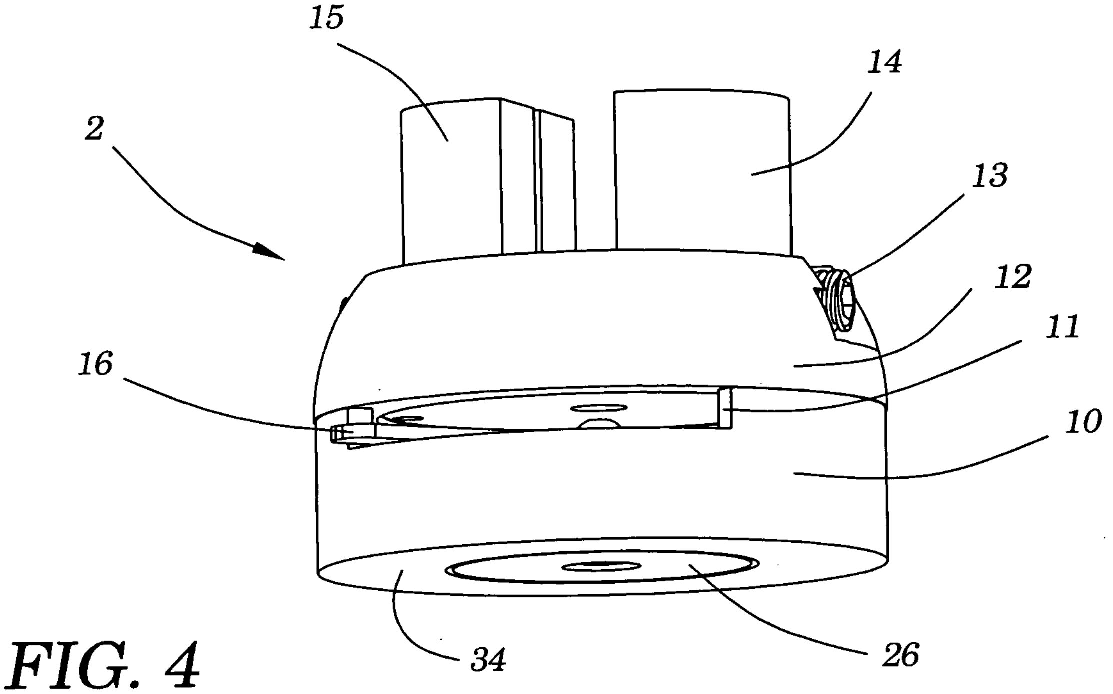
FIG. 4 and FIG. 5; are perspective views of the top vise portion of the invention and illustrates how a magnet in the base moves up and down when a lever is operated.
Figure 5:
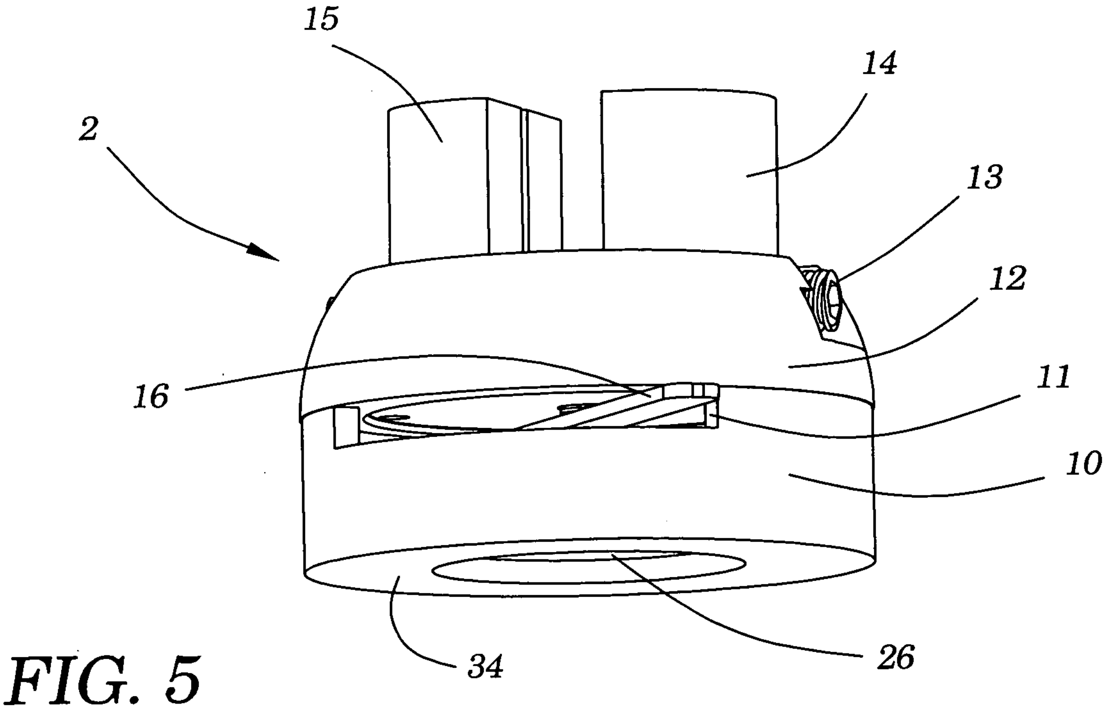
Figure 6:
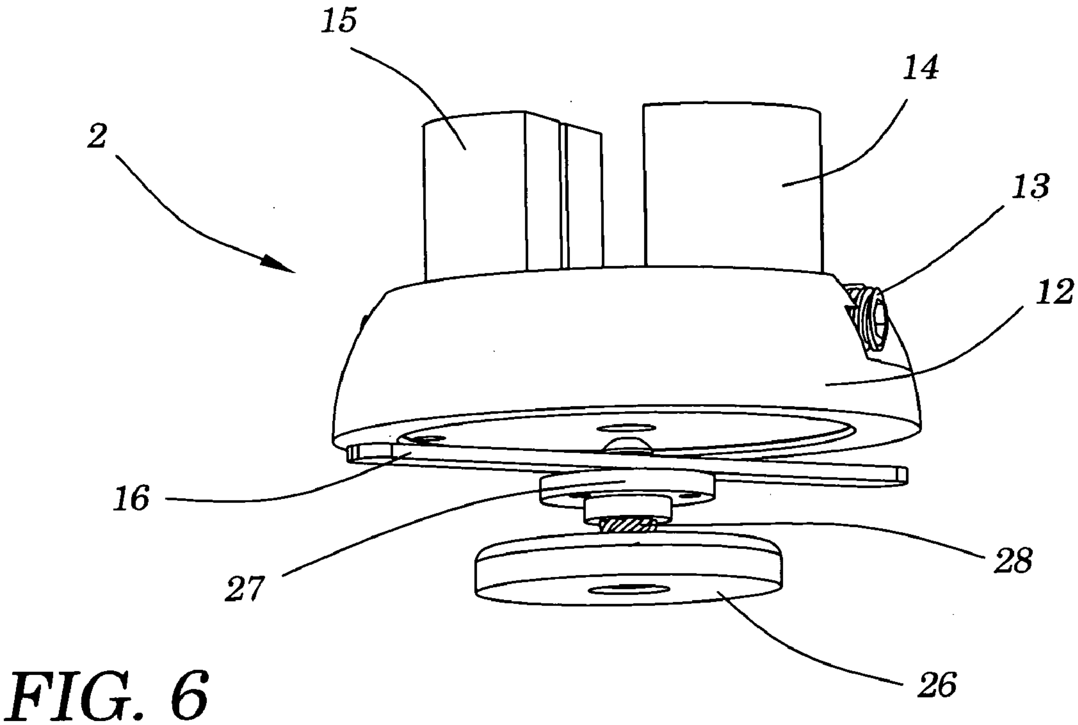
FIG. 6 and FIG. 7; are the same views as FIG. 4 and FIG. 5, differing in that the portion of the vise surrounding the magnet and lever is removed to help show how the magnet is moved with a screw and nut connected to the lever.
Figure 7:
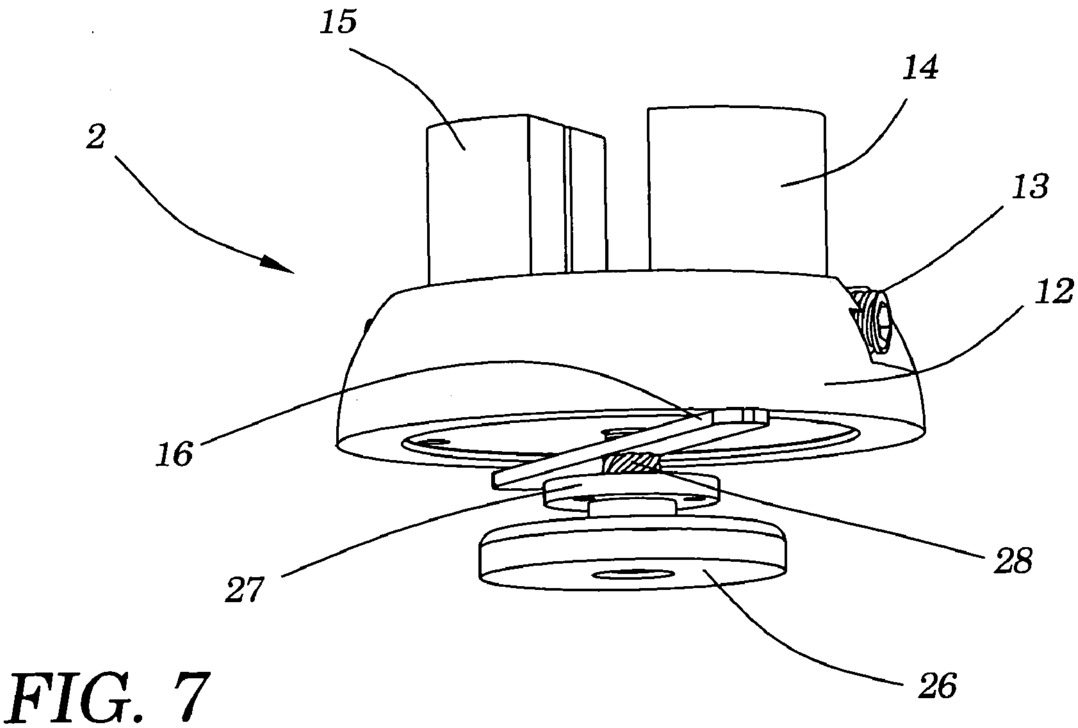

FIG. 4 and FIG. 8 illustrate lever 16 to one side of lever-slot 11 and the magnet 26 flush with base-block-bottom-face 34. With the magnet in this position, the magnet will be firmly magnetically locked down against the top of disc 7 (illustrated in FIG. 1) and therefore lock the entire vise 2 in position against the top of disc 7. FIG. 5 and FIG. 9 illustrate the lever at other side of lever-slot 11 and the magnet 26 lifted up. When the magnet is raised in this position, the operator can easily slide the vise 2 where desired on top of disc 7. When the vise is in the position desired, the operator releases lever 16. The magnetism then pulls the magnet down to the top of disc 7 and thus turns the lever back to the original location as illustrated in FIG. 4 and FIG. 8.

Figure 2:
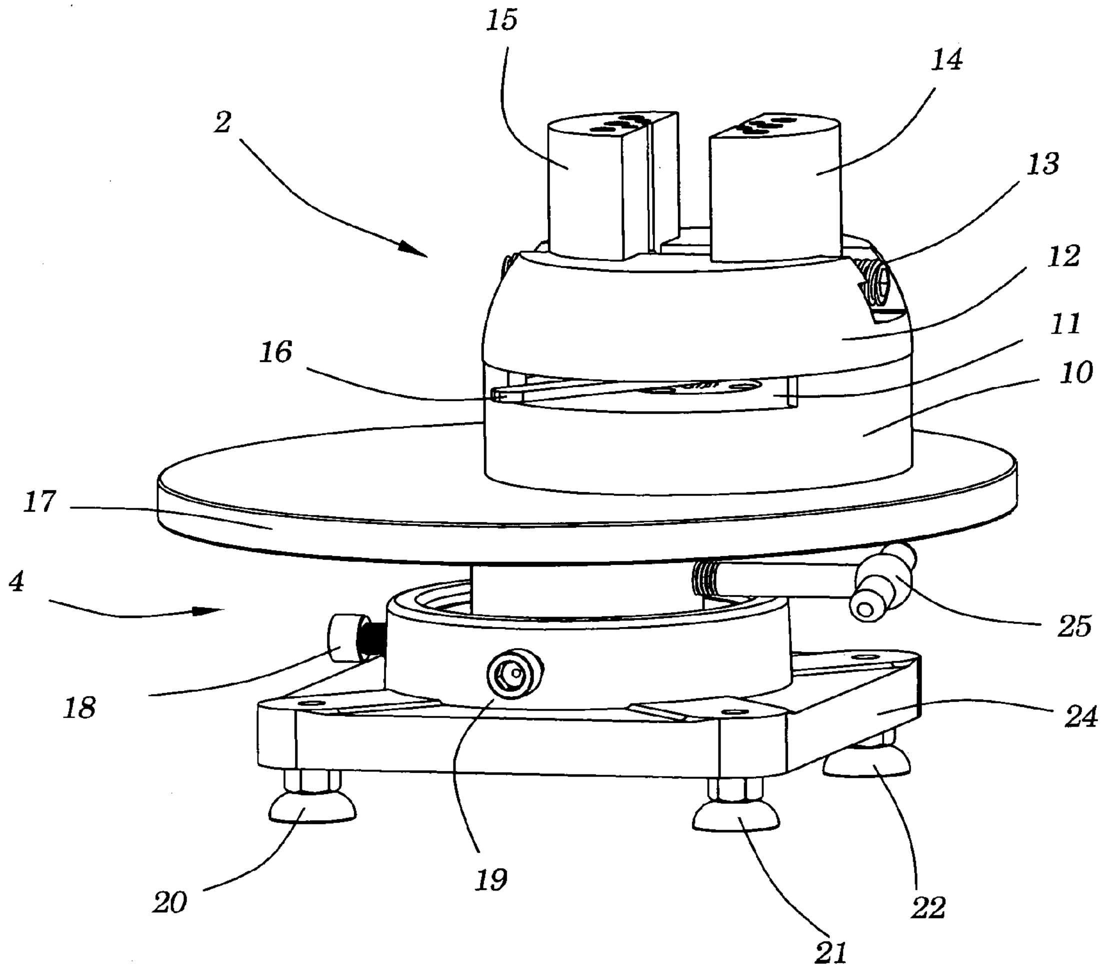
FIG. 2; is the same view as FIG. 1, differing in that the vise portion is displayed positioned off center of the rotating turntable.
Figure 3:
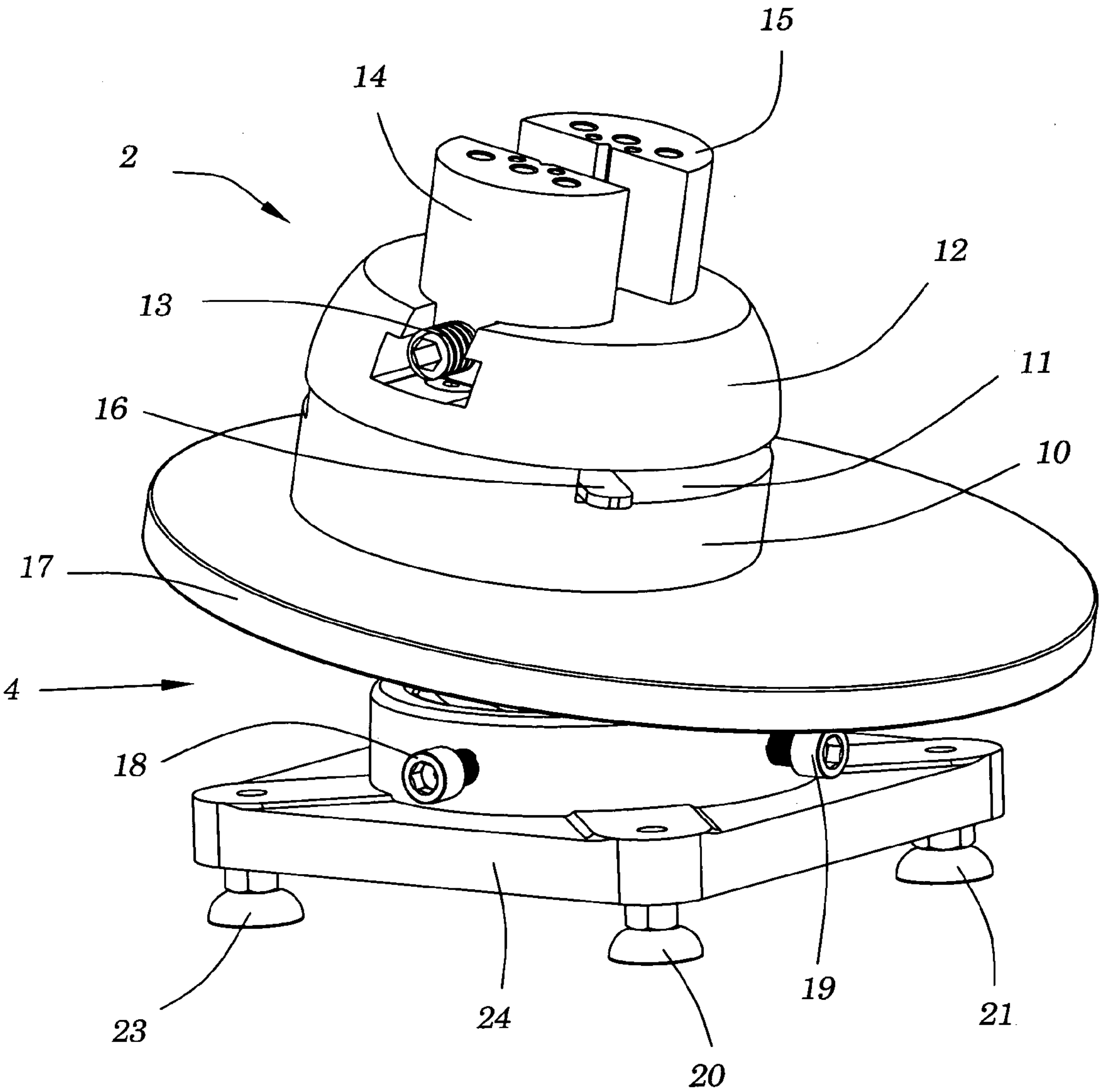
FIG. 3; is a similar view as FIG. 2, differing in that the rotating turntable is displayed tilted and the vise positioned off center.

FIG. 2 illustrates how the vise 2 can be positioned anywhere on the top surface of disc 17 by simply moving lever 16, positioning the vise and releasing the lever. FIG. 3 illustrates how disc 17 can be tilted and locked with screws 18 and 19, and how vise 2 can be positioned anywhere on the top surface of disc 17. When disc 17 is tilted and vise 2 is positioned off center of disc 17 a great deal, counter balance magnetic weights (not shown in the illustrations) may be placed on disc 17 if desired by the operator to help keep the swing of the apparatus in balance.

The thin polymer sheet material such as plastic or nylon (not shown in the illustrations) that is fastened (preferably by gluing) to the base-block-bottom-face 34 is utilized for five reasons:

A. It prevents the magnet from being in direct contact with the top of disc 7 that otherwise may damage the magnet or top of disc 7;

B. It prevents metal chips or filings that the user may be making during hand working operations from getting to and sticking to the magnet;

C. For ease of cleaning, the plastic or nylon sheet covering the base-block-bottom-face 34 can easily be wiped off;

D. When the user is positioning the vise 2, it allows ease of movement of the vise on the top of disc 7; and E. It protects the surface finish from scratches and wear of both the base-block-bottom-face 34 and the top of disc 7.

CONCLUSION, RAMIFICATIONS, AND SCOPE

Accordingly, the reader will see that the invention provides an improved rotating and tilting positioning vise. The design with the magnet lifting device allows complete use of the top of the turn table for positioning the vise where needed by a user. It is easy and quick to unlock the magnetism with the lever, move the vise and simply release the lever to lock. The invention allows the turn table to be tilted and locked, as well as providing a locking and dragging feature for the rotating axis.

Although the invention has been described with reference to the illustrated embodiment, it is noted that equivalents may be employed and substitutions made herein without departing from the scope of the invention as recited in the claims. For example:

The embodiment in the illustrations makes use of a screw and nut to lift the magnet off the surface of the turn table. An equivalent can be designed using one or more wedges that would fit under a lever. The lever would ride against the one or more of these wedges and as the lever was moved by the operator; the lever would slide up on one or more of the wedges. Since the lever is directly connected to the magnet, the magnet would therefore be lifted off of the surface of the turn table.

Accordingly, the scope of the invention should be determined not by the embodiment illustrated, but by the appended claims and their legal equivalents.

We claim:

1. A positioning vise comprising:
a vise housing having a top surface and a bottom surface;
said vise housing containing at least one magnet; and
said at least one magnet is moveable within a range from substantially flush with said bottom surface and a position above said bottom surface.

2. A positioning vise as recited in claim 1 further comprising:
a base plate having a central axis and a top surface made of a magnetic attraction material; and
said base plate being rotatable about said central axis.

3. A positioning vise as recited in claim 2 wherein:
said base plate is tiltable.

4. A positioning vise as recited in claim 1 further comprising: a lever.

5. A positioning vise as recited in claim 1 further comprising:
a polymer sheet attached to said bottom surface.

6. A positioning vise as recited in claim 1 further comprising:
at least two vise clamping jaws.

7. A positioning vise as recited in claim 1 further comprising:
a base plate having a central axis and a top flat surface made of a magnetic attraction material;
said base plate being rotatable about said central axis;
a lever;
said base plate is tiltable; and
at least two vise clamping jaws.

8. An apparatus for holding, rotating and positioning objects comprising:
a base plate having a central axis and made of a magnetic attraction material;
said base plate being rotatable about said central axis;
a holder housing having a top surface and a bottom surface;
said holder housing containing at least one magnet; and
said at least one magnet is moveable within a range from substantially flush with said bottom surface and a position above said bottom surface.

9. An apparatus for holding, rotating and positioning objects as recited in claim 8 further comprising: a lever.

10. An apparatus for holding, rotating and positioning objects as recited in claim 8 wherein:
said base plate is tiltable.

11. An apparatus for holding, rotating and positioning objects as recited in claim 8 further comprising: at least two vise clamping jaws.

12. An apparatus for holding, rotating and positioning objects as recited in claim 8 further comprising: a polymer sheet attached to said bottom surface.

13. An apparatus for holding, rotating and positioning objects as recited in claim 8 further comprising:
said base plate is tiltable;
a lever; and
at least two vise clamping jaws.

14. A method of holding an object for hand working operations comprising:
providing a holding object device having a top and a bottom;
said object holding device containing a magnet;
a base plate having a central axis and a top flat surface made of a magnetic attraction material;
said base plate being rotatable about said central axis; and
said magnet is moveable within a range from substantially flush with said bottom surface and a position above said bottom surface.

15. A method of holding an object as recited in claim 14 further comprising:
a lever.

16. A method of holding an object as recited in claim 14 further comprising:
said holding object device having at least two vise clamping jaws; and
said base plate is tiltable.

17. A method of holding an object as recited in claim 14 further comprising:
a polymer sheet attached to said bottom.

18. A method of holding an object as recited in claim 14 further comprising:
said holding object device having at least two vise clamping jaws;
said base plate is tiltable; and
a lever.

* * * * *